UNITED STATES PATENT OFFICE.

WILLIAM S. GRISWOLD, OF ELYRIA, OHIO.

WALL-PLASTER AND CEMENT FOR BRICKWORK.

SPECIFICATION forming part of Letters Patent No. 662,643, dated November 27, 1900.

Application filed April 6, 1900. Serial No. 11,792. (No specimens.)

*To all whom it may concern:*

Be it known that I, WILLIAM S. GRISWOLD, a citizen of the United States, residing at Elyria, in the county of Lorain and State of Ohio, have invented a new and useful Composition of Matter to be Used as a Wall-Plaster and Cement for Brickwork, of which the following is a specification.

My composition consists of the following ingredients or their equivalents combined substantially in the proportions, by weight, as follows, to wit: calcined gypsum or plaster-of-paris, forty-five parts; hydraulic cement, twenty-five parts; ground or pulverized shale, fifteen parts; ground or pulverized limestone or marble, ten parts, thoroughly mingled and intermixed. If to be used as a wall-plaster on lathing, I also incorporate and mix with the above ingredients any of the ordinary fibers in such proportions as may be desired, varying the quantity and the amount according to the grade and quality of fiber used. In case of using wood fiber I recommend and would use about seven and one-half parts, by weight, of dry wood fiber. If asbestos, hair, or other fiber should be used, the quantity should be sufficient to obtain results satisfactory to the party using it; also, a filler may be used in combination with the above ingredients to give it more bulk, and consequently greater covering capacity, as granulated cork or fine sawdust. When used for plaster or cement on brick walls, sand should be added in such quantities as may be found desirable—from one-half to two-thirds, by weight, of the total amount—and also a stucco-retarder should be added in cases where the same is used as a wall-plaster in amount sufficient to retard the setting qualities of the calcined gypsum for a sufficient length of time to finish working and floating down the plaster after being spread on the walls. This amount will be varied according to the quality of the retarder used, being about three-tenths of one per cent., by weight, of the amount of gypsum used of the ordinary commercial article known by the name of "stucco-retarder."

I do not make any claim to the stucco-retarder, as it is common in all cement and wall plasters in which gypsum and cement are component parts.

The proportions of my ingredients above specified may be varied more or less and give good results; but the proportions above given, all things considered, I believe to be the best. The combination of the ingredients specified make a plaster that works easily under the trowel, has large covering capacity, and becomes very strong, hard, and tough a few days after being used. It is not liable to crack, chip, or crumble, will not deteriorate appreciably or lose its strength or firmness by age, as many of the wall-plasters that are otherwise compounded do. It does not gather dampness and is slightly affected by fire or changes of temperature. The materials are cheaply and easily procured and the plaster easily made and when wanted for use is mixed with water to the desired plasticity and spread in the ordinary manner, when after drying, by reason of the chemical affinities and action of the several ingredients upon each other, a homogeneous, strong, tough, and durable combination is formed which is specially adapted for the purposes designed without any of the common objections, such as dampness and deterioration, attending plasters where lime, clay, and kindred substances are used as component parts of such plasters.

What I claim as new, and desire to secure by Letters Patent of the United States, is—

A composition of matter comprising calcined gypsum, cement, shale and limestone in combination in the proportions specified and in which is incorporated suitable fiber and stucco-retarder, all for the purposes as above set forth and substantially as described.

In testimony whereof I have signed my name to this specification, this 31st day of March, A. D. 1900, in the presence of two subscribing witnesses.

WILLIAM S. GRISWOLD.

Witnesses:
MABEL R. COPAS,
MARY E. FAY.